United States Patent
Bull et al.

(10) Patent No.: US 6,208,975 B1
(45) Date of Patent: Mar. 27, 2001

(54) INFORMATION AGGREGATION AND SYNTHESIZATION SYSTEM

(75) Inventors: David Stanley Bull, Irving; Robert Neal Carr, Jr., Watauga; Joseph Robert Offutt, Jr., Grapevine, all of TX (US)

(73) Assignee: Sabre Inc., Dallas Fort Worth Airport, TX (US)

( * ) Notice: Subject to any disclaimer, the term of this patent is extended or adjusted under 35 U.S.C. 154(b) by 0 days.

(21) Appl. No.: 08/878,668

(22) Filed: Jun. 19, 1997

Related U.S. Application Data

(62) Division of application No. 08/685,805, filed on Jul. 24, 1996.
(60) Provisional application No. 60/015,384, filed on Apr. 1, 1996.
(51) Int. Cl.[7] ..................................................... G06F 17/60
(52) U.S. Cl. ............................................... 705/14; 705/10
(58) Field of Search ................................. 705/14, 26, 10; 395/200.31, 200.33, 200.47, 200.54; 709/202, 203, 217, 218, 219; 707/3, 6

(56) References Cited

U.S. PATENT DOCUMENTS

| 5,309,355 | 5/1994 | Lockwood | 705/6 |
| 5,347,632 | 9/1994 | Filepp et al. | 709/202 |

(List continued on next page.)

FOREIGN PATENT DOCUMENTS

| 649121A2 | 10/1994 | (EP) | G07F/17/16 |
| 94/12646 | 10/1994 | (EP) | G06F/17/60 |
| 93/00628 | 1/1993 | (WO) | G06F/15/22 |
| 94/00206 | 11/1997 | (WO) . | |

OTHER PUBLICATIONS

IEEE, Article by M. F. Wyle, entitled "A Wide Area Network Information Filter", Oct. 1991, pp. 10–15.

(List continued on next page.)

*Primary Examiner*—Stephen R. Tkacs
*Assistant Examiner*—Alexander Kalinowski
(74) *Attorney, Agent, or Firm*—Finnegan, Henderson, Farabow, Garrett & Dunner, L.L.P.

(57) ABSTRACT

An information aggregation and synthesization system and process. The present invention provides aggregation and packaging of structured or unstructured information from disparate sources such as those available on a network such as the Internet. A network compatible/addressable interface device is operated by a user. The network interface device communicates with local datastores or network accessible datastores via an addressing scheme such as Uniform Resource Locator addresses (URLs) utilized by the Internet. Data passing between the network interface device and the datastores is accessed, polled, and retrieved through an intermediary gateway system. Such aggregated information is then synthesized, customized, personalized and localized to meet the information resource requests specified by the user via the network interface device.

12 Claims, 7 Drawing Sheets

U.S. PATENT DOCUMENTS

| | | | |
|---|---|---|---|
| 5,404,393 | 4/1995 | Remillard | 379/93.25 |
| 5,404,505 | 4/1995 | Levinson | 070/10 |
| 5,422,809 | 6/1995 | Griffin et al. | 705/5 |
| 5,442,771 | 8/1995 | Filepp et al. | 709/219 |
| 5,459,859 | 10/1995 | Senda | 707/10 |
| 5,491,820 | 2/1996 | Nelove et al. | 707/10 |
| 5,530,852 | 6/1996 | Meske, Jr. et al. | 709/206 |
| 5,555,407 | 9/1996 | Cloutier et al. | 707/104 |
| 5,572,643 | 11/1996 | Judson | 709/218 |
| 5,594,910 | 1/1997 | Filepp et al. | 7412/28 |
| 5,623,652 | 4/1997 | Vora et al. | 707/10 |
| 5,649,186 | 7/1997 | Ferguson | 707/10 |
| 5,696,965 * | 12/1997 | Dedrick | 707/10 |
| 5,710,886 * | 1/1998 | Christensen et al. | 705/14 |
| 5,724,521 * | 3/1998 | Dedrick | 705/26 |
| 5,740,549 * | 4/1998 | Reilly et al. | 705/14 |
| 5,754,939 * | 5/1998 | Herz et al. | 395/200.49 |
| 5,819,285 * | 10/1998 | Damico et al. | 707/104 |

OTHER PUBLICATIONS

Object Magazine, Article by Darrell Woelk, Michael Huhns, and Christine Tomlinson, entitled "Uncovering The Next Generation of Active Objects", Jul./Aug. 1995, pp. 33–40.

Online Information 94 Proceedings, Article by David Gee and Peter Wooliams, entitled "Novel Approaches to Automating the Gathering of Intelligence from the Online Community through the Internet ", 1994, pp. 501–511.

Multimedia At Work, Article by Thomas D. C. Little, entitled "Commerce on the Internet", 1994, pp. 74–78.

Database WPI Week 96340813.

Aubrey, David, "Nomads of the Net (intelligent agents for data searching)," Computer Shopper, vol. 15, No. 12, p. 616(4), pp. 1–8, Dec. 1995.

Yuwono et al., "Search and Ranking Algorithms for Locating Resources on the World Wide Web," IEEE, pp. 164–171, 1996.

"The Whole Internet –For Windows 95", Author Ed Krol & Paula Ferguson, pp.117–121, 126.

* cited by examiner

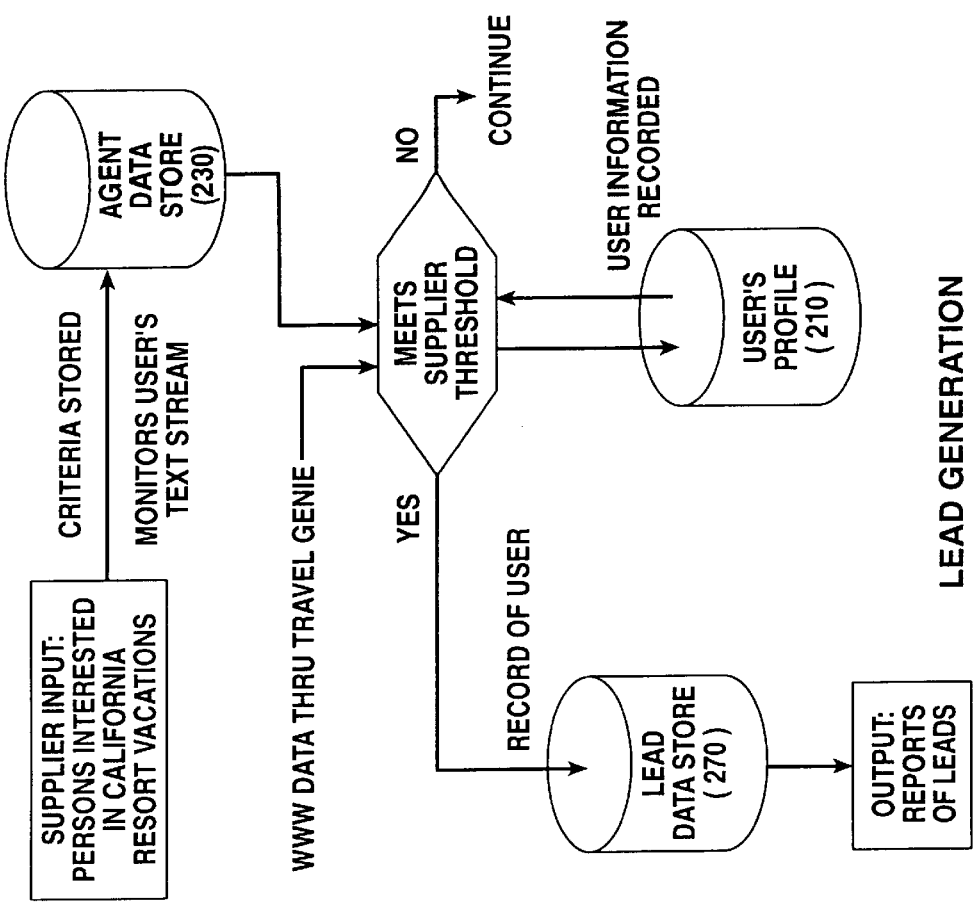

Fig. 8

LEAD GENERATION

Fig. 3

| DIALOG MANAGEMENT (201) |
|---|
| 2011 NATURAL LANGUAGE QUERY |
| 2012 FOREIGN LANGUAGE TRANSLATION |
| 2013 CUSTOM USER INTERFACE |
| 2014 SITUATIONAL AND LOCATIONAL CUSTOMIZATION |
| 2015 INTEGRATED VIRTUAL REALITY |
| 2016 INTERACTIVE TV |

| AGENT DATA STORE (230) |
|---|
| 231 PREESTABLISHED SOFTWARE TEXT SEARCH AGENTS |
| 232 PERSONAL SEARCH TEXT AGENTS |
| 233 AD / COUPON INSERTION AGENTS |
| 234 UNMET NEEDS AGENTS |
| 235 LEAD GENERATION AGENTS |

OPERATIONS SYSTEM (290)

| 291 USER GREETING SYSTEM | |
|---|---|
| 292 TG SESSION MANAGEMENT | 2921 SESSION PROFILE UPDATE |
| | 2931 SEARCH REDUCTION SYSTEM |
| | 2932 PICTURE SEARCH SYSTEM |
| | 2933 COLLABORATIVE DESTINATION ASSESSMENT |
| | 2934 SMART INDEXES |
| | 2935 SMART SEARCH |
| 293 SEARCH REDUCTION SYSTEM | |
| 294 USER INTERRUPT SYSTEM | |
| 295 R/T SESSION ANALYSIS SYSTEM | |
| 296 AD / COUPON INSERTION SYSTEM | 2961 SMART ADS |
| 297 PERSISTANT AGENT ENTRY | |
| 298 DATA SUPPORT SYSTEMS | 2981 DATA INDEXING SERVICE |
| | 2982 DATA MONITORING SERVICE |
| 299 UNMET NEEDS ANALYSIS SYSTEM | 2991 REAL TIME MARKETPLACE |

*Fig. 4*

UNMET NEED AGENT

SOFTWARE AGENT ADVERTISING INSERTION

AUTOMATED PROFILE GENERATION

INFORMATION AGGREGATION AND SYNTHESIZATION SYSTEM

CROSS REFERENCE TO RELATED APPLICATION

This is a divisional application of copending Ser. No. 08/685,805 filed on Jul. 24, 1996.

This application is based on Provisional Application No. 60/015,384 entitled INFORMATION AGGREGATION AND SYNTHESIZATION SYSTEM, filed Apr. 1, 1996.

BACKGROUND OF THE INVENTION

1. Field of the Invention

The present invention is directed to an information aggregation and synthesization system which connects with local and network accessible datastores through an intermediary gateway system.

2. Prior Art

Widespread use of personal computers, modems (modulator/demodulator devices that enable data to be transmitted) and data connections has allowed the growth of computer networks. The Internet serves as an example of a type of computer network, and indeed, is a large network of networks, all inter-connected, wherein the processing activity takes place in real time. The Internet offers mail, file transfer, remote log in and other services. The World Wide Web (WWW) is the fastest growing part of the Internet.

On the World Wide Web (WWW), a technology called hypertext allows Internet addressable resources to be connected, or linked, to one another.

In the past, certain, limited aspects, of the present invention have been proposed, such as monitoring of computer usage.

Lockwood (U.S. Pat. No. 5,309,355) provides a computerized tool to augment sales and marketing capabilities of travel agency personnel. The system creates and displays customized sales presentations from (1) stored client profiles; (2) travel agent assessment of client profiles; and (3) computerized reservation system responses to client profiles. Selected factors are analyzed by the operating program based upon an organization hierarchy of specifications.

Lockwood differs from the present invention in:

1) Data sources—Lockwood uses content from both a videodisk (static) and computerized reservation systems (dynamic). The present invention is capable of deriving content from totally dynamic sources on the World Wide Web (including Internet and local datastores or caches simulating a WWW component).
2) Client Profiles—Lockwood proposes that these be input by a Travel Agent. In the present invention, profiles are entered by the consumer (explicit) or collected through analysis of online session activity (implicit).
3) Data Organization—Lockwood uses preindexed videodisks. The present invention indexes prequalified WWW sites, updating these as they change or as users expand their WWW searches.
4) Programation—Lockwood places the entire index of information in a PROM. This index is exercised by the sequencer which displays a sales presentation. The present invention stores indices in magnetic medium but retrieval and presentation of the indexed information is executed dynamically on premised upon user input.

Remillard (U.S. Pat. No. 5,404,393) discloses an electronic device and method for monitoring television activity and communicating the monitored activity to a facility and initiating appropriate actions. A controller initiates an automated configuration by acquiring configuration information. The controller monitors television channel selection information and assembles the monitored television information into a user profile. An option includes capturing images or text and forwarding to the user through a mail facility.

Remillard differs from the present invention in that it suggests a device to access distant information through a television set. The present invention utilizes network addressable information resource and human interface elements such as those used by the Internet, one of which may in fact be attached to a TV. Remillard's invention (or that of others) may be used as a means to acquire WWW information but does not contemplate the present invention.

Levinson (U.S. Pat. No. 5,404,505) provides information in a database which is tagged with indices to form an hierarchical structure. Software having a set of subscriber requests handling routines interacts with a data filter subsystem. The data filter subsystem receives incoming data stream and selects those packets that meet certain selection criteria. A special smart caching routing is provided for anticipating future requests by the user.

Levinson differs from the present invention:

1) Levinson proposes a satellite based information retrieval system. This is based on fixed data sources (Compuserve, Prodigy) being queried by a user on a telephone line with the results being returned via a television connection. The present invention uses a similar infrastructure to return requested information to the user but our process for identifying content that is relevant is software agent based and retrieval of dynamic content is from the WWW vs. fixed data sources. The present invention can use any means: for example, TV, Cable Modem, RF, ISDN, Modem, fixed line (T-2, T-3 etc.).
2) Levinson would establish user inputted profiles for "Automatic Data Retrieval". The present invention supplements user provided profile information by constructing implicit profile recognition patterns, based upon historical search activity.
3) Levinson's invention does not specify any of the six components proposed in the present invention.

Griffin et al. (U.S. Pat. No. 5,422,809) provides an information storage and retrieval system for storing, referencing and retrieving various travel information from a database. A querying device queries the user for input used to define the field for the travel destination desired. Statistical records are produced which provide relevant information relating to travel destinations using the system. Information is thus provided which can be used to evaluate the popularity of particular destinations.

Griffin et al. differs from the present invention in that it discloses a kiosk system and the processes and subprocesses for self service travel planning and reservations. While the present invention provides similar capability-using other means, the six features of the present invention are not disclosed in this patent.

Senda (U.S. Pat. No. 5,459,859) discloses an information providing system using a communication network which stores attribute/schedule information from each subscriber and uses that information to match with other subscribers.

Senda differs from the present invention in that it is a software based system for meeting a system while traveling. It involves a best fit match between profiles. The present invention also provides a "best fit" but between software agents and data being viewed. Senda has both formatted selection and source data inputted for a specific purpose (to meet someone). The present invention uses software agents to format selection data but the source data is unformatted from the WWW.

Belove et al. (U.S. Pat. No. 5,491,820) discloses a storage transmission mechanism for retrievable items and may be used on the Internet. The system may include a filter on each client or on the server between the user and the Internet.

Belove et al. differs from the present invention in that it is a client server object caching system. Except for the pruning mechanism that limits the information cached at the client side, there is no resemblance to the present invention.

Accordingly, it is a principal object and purpose of the present invention to provide an information aggregation and synthesization process and system connecting a network operable device and a plurality of local or network accessible datastores wherein data passing there between is accessed, polled and retrieved through an intermediary gateway system.

SUMMARY OF THE INVENTION

The present invention includes at least six different aspects or functional components which are related, all involving use of a computer accessible data network such as the Internet. While the individual aspects may be utilized together, they may also be used separately.

The user initiates access to the system through a network addressable interface device (such as a personal computer, Internet Appliance, an interactive television or even a personal digital assistant or smart telephone). The user is then connected to the information aggregation and synthesization system via a network service provider (most likely through the Internet or some variation). The user logs on to the system either by name, address, etc. or with some pseudonym (or some combination). This allows the user's activity to be tracked and establishes a log of the user's activity during the current online experience (session). The user is also asked for explicit profile information concerning preferences. These preferences will be used to narrow the information retrieval and may be collected when the user first logs in or incrementally as the user asks for specific information. This profile information will be kept and updated as the individual user's preferences change.

Once the user is logged in, the information aggregation and synthesization system will facilitate the user's access to local information or information distributed on a network (this network could be a local area network or a wide area network such as the Internet). All user access to information is through the system.

This information is topically oriented (Germany travel, the Olympics, Spring Break or even new cars), composed of files and file references using the Hypertext Markup Language ("HTML") or similar tagged reference format that may be prescreened for relevance and appropriateness. Selected text can be "expanded" at any time to provide other information. These words are, thus, linked to other documents. This information is indexed in this fashion in advance of the user's logging in.

A gateway is provided into the WWW for shopping while retaining the user passing through the information aggregation and synthesization system. A gateway is provided to poll, access and retrieve information from various locations. A filtering process is provided and the resulting information is returned to the requested party.

The user is presented with a variety of search, display and output options. The search options include: 1) Search using key words or combinations; 2) Use of complex software text search agents that have been predefined by the information aggregation and synthesization system site operators. These agents take advantage of the expansive subject matter expertise in understanding which search parameters will best serve the user's search needs; 3) Use of search patterns and agents from this user's previous sessions, perhaps expanded by available specials and promotions; 4) Natural Language Query; and 5) Some combination of 1), 2), 3) and 4).

The user selects information to be viewed from the results of the search. This information is retrieved from its source and presented to the user in the manner and at the time requested. The available display options include but are not limited to: display on the user's network capable device, personal TV channel, customized Internet page, custom CD-ROM, electronic mail, mobile devices (Personal Digital Assistants, telephones and pagers) and facsimile. Information retrieval and display can be text, still pictures, videos, Interactive multimedia, audio and geographic.

Along with displays, including those for data entry, searches, search results, information retrieval, the user will be presented with advertisements and/or coupons based on criteria entered by advertisers. This criteria may take the form of simple logic, linking an ad/coupon with a display or be derived from complex software text search agents that analyze one or more of the following: The user's looking pattern, the user's psychographic profile, the user's personal profile, the availability of the advertiser's/couponer's goods or services at the instant in time that the criteria is being exercised. The placement of the ad/coupon will be logged along with user profile information and provided to the advertiser/couponer in some form of report.

During a user session or when a user completes a session, the user's looking activity is analyzed for patterns, preferences and trends and the profile annotated or updated so that when they next use the information aggregation and synthesization system, the nominated searches will be customized to their individual desires.

The six aspects of the information aggregation and synthesization system are:

I. URL Munging

The World Wide Web ("WWW") is characterized by computer (user) connection through an Internet Service Provider to any WWW address or site. Hence, use of the WWW is like placing individual telephone calls to many merchants, trying to compare products and services. URL Munging is the process that allows the goods and services of many merchants to be displayed through a single virtual shopping center.

This involves encapsulating and indexing the content of various merchants as well is modifying parts of the internal structure, repurposing and redirecting it to be integrated into the Travel Genie Infrastructure. This allows content from and access to multiple merchants to be aggregated, synthesized and accessed at a single WWW site.

II. WWW CD-Rom

World Wide Web ("WWW") access from homes is often constrained by the lack of sufficient data communications bandwidth within a typical residential infrastructure (WWW information may be accessed through the Internet WWW, a local Internet WWW, or a local datastore or cache simulating a WWW component).

The Internet user will select World Wide Web (WWW) content for retrieval using a search engine to return selected WWW references. The user will then select certain of these references to be included in a custom CD which will be burned or recorded onto a CD and then sent by express delivery to the user.

III. Software Agent Advertising Insertion

Currently, advertisements in WWW pages are tightly tied to each page, are inserted based on keywords or on a psychographic profile of the user.

Certain criteria will be entered which delineates a pattern that is requested to be monitored. When this pattern is seen (or is in close match) in the user's WWW activity, the insertion mechanism is activated. If a certain web page is requested, the present invention will display a particular advertisement. The ad will be inserted based on the content of the existing web page being read. An analysis of the text stream of the user's interactive session will be performed on-line. For instance, if the user accesses web pages for Holiday Inns on the West Coast, the insertion mechanism could be established to automatically insert ads for Hilton Inns on the West Coast.

IV. Automated Profile Generation

Presently, user's profiles are collected based on explicit entry by the user, and extraction from demographic data collected from a variety of sources.

In the present invention, the searching patterns of the user on the Internet are monitored. A set of software text agent profiles is developed and may be integrated with explicitly collected profile information. The automated profile generation will have both explicit profile information gathering and implicit profile information gathering capabilities.

As the user uses the information aggregation and synthesization system, the pattern of information being viewed is analyzed and the user presented with search ideas as well as promotions and specials from suppliers based on these patterns.

V. Automated Lead Generation

Currently, leads are generated by recording user's WWW site selection. (For Example, user's visiting a "Chicago" information site would be "Chicago" leads.)

In the present invention, the user WWW viewing patterns are recorded. These and optionally the user's profile are matched against software text agents entered by a supplier. When these agents match a pattern/profile, the supplier is notified. When this profile is approximately matched, the supplier is notified.

VI. Software Agent Unmet Needs Generation

Currently, there is no on-line immediately accessible system to analyze unmet needs of Internet users.

In the present invention, records will be maintained from user usage of the Internet on what consumer queries are unmet by the WWW content retrieved. The invention will intuitively construct a profile from user inputted data. This will be done by recognizing unanswered queries and/or user initiated requests. From this, a profile will be developed to identify new markets. As an example, if one hundred people inquire about snorkeling off the coast of Texas, this information could be sold to a tour provider who could not only prepare a travel package but sell the leads to a company. Thus, the system will be able to gather "negative" leads.

In the course of a session, the user may desire information not yet available. This information could be in the form of a product, a service or an event. The user then can establish a persistent (stays around after the user's session is over) complex software text search agent to monitor future information additions to the System and alert the user through a variety of means (facsimile, electronic mail, text page, voice, pager) that the information that was requested is available or in some instances, provide the information directly. The set of persistent agents will also be analyzed by the information aggregation and synthesization system operators and provided to potential suppliers who would in turn develop new product offerings which would be added to the information aggregation and synthesization system sources.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention. In the drawings:

FIG. 3 illustrates dialog management and agent datastore categories consistent with the present invention;

FIG. 4 illustrates operation systems categories consistent with the present invention;

FIG. 8 illustrates a flow diagram of lead generation consistent with the present invention.

DETAILED DESCRIPTION

In the embodiments described herein and accompanying figures, a travel information scenario is depicted. It will be understood that the present invention is capable of performing similarly for other venues, such as mortgages, automobile sales and any other interactive exchange of information sought by information content seekers and potentially satisfied by information content providers.

Initial Setup For User

Figure 1:
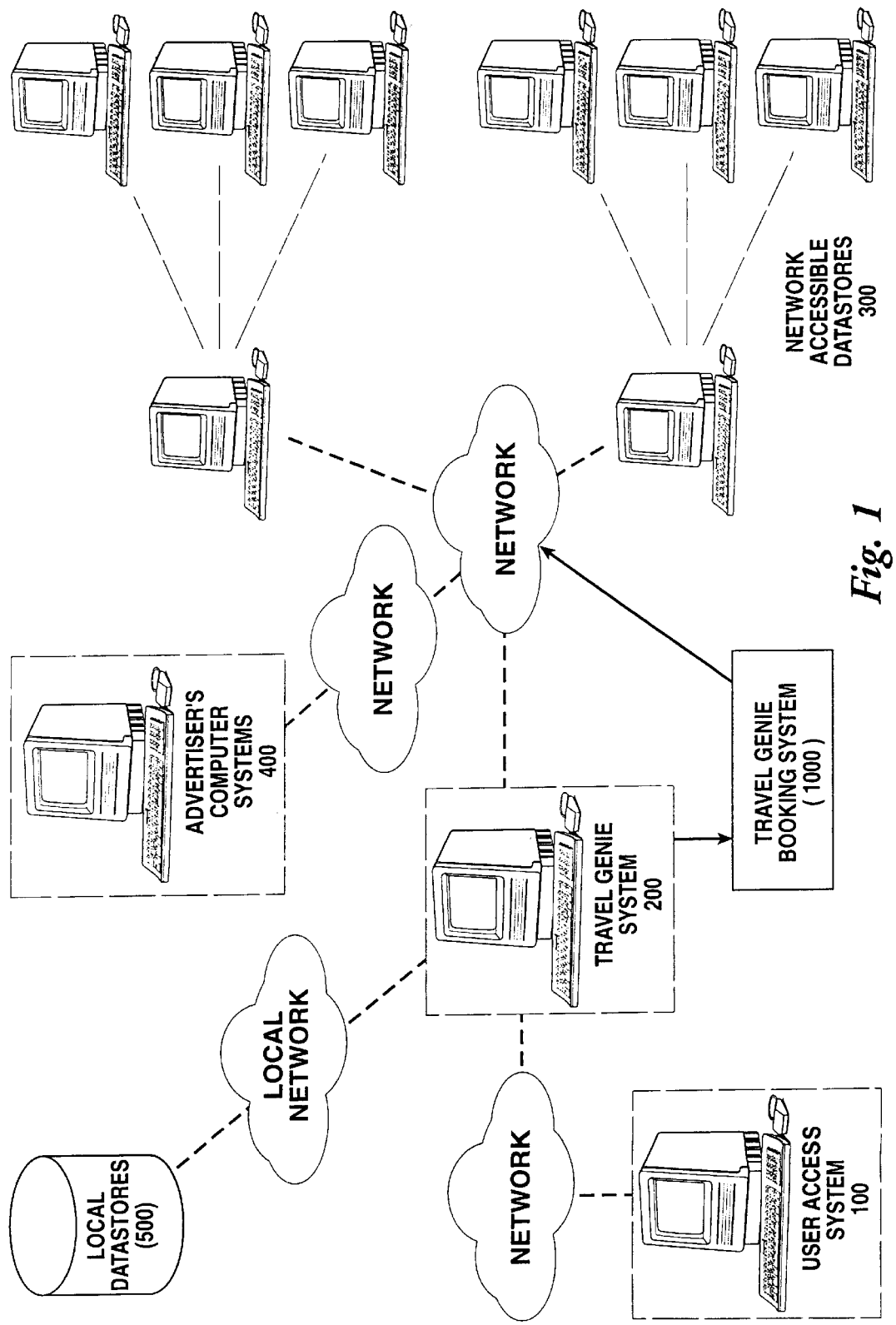
FIG. 1 illustrates an interface of the present system with a user access system and various data sources.
Figure 2:
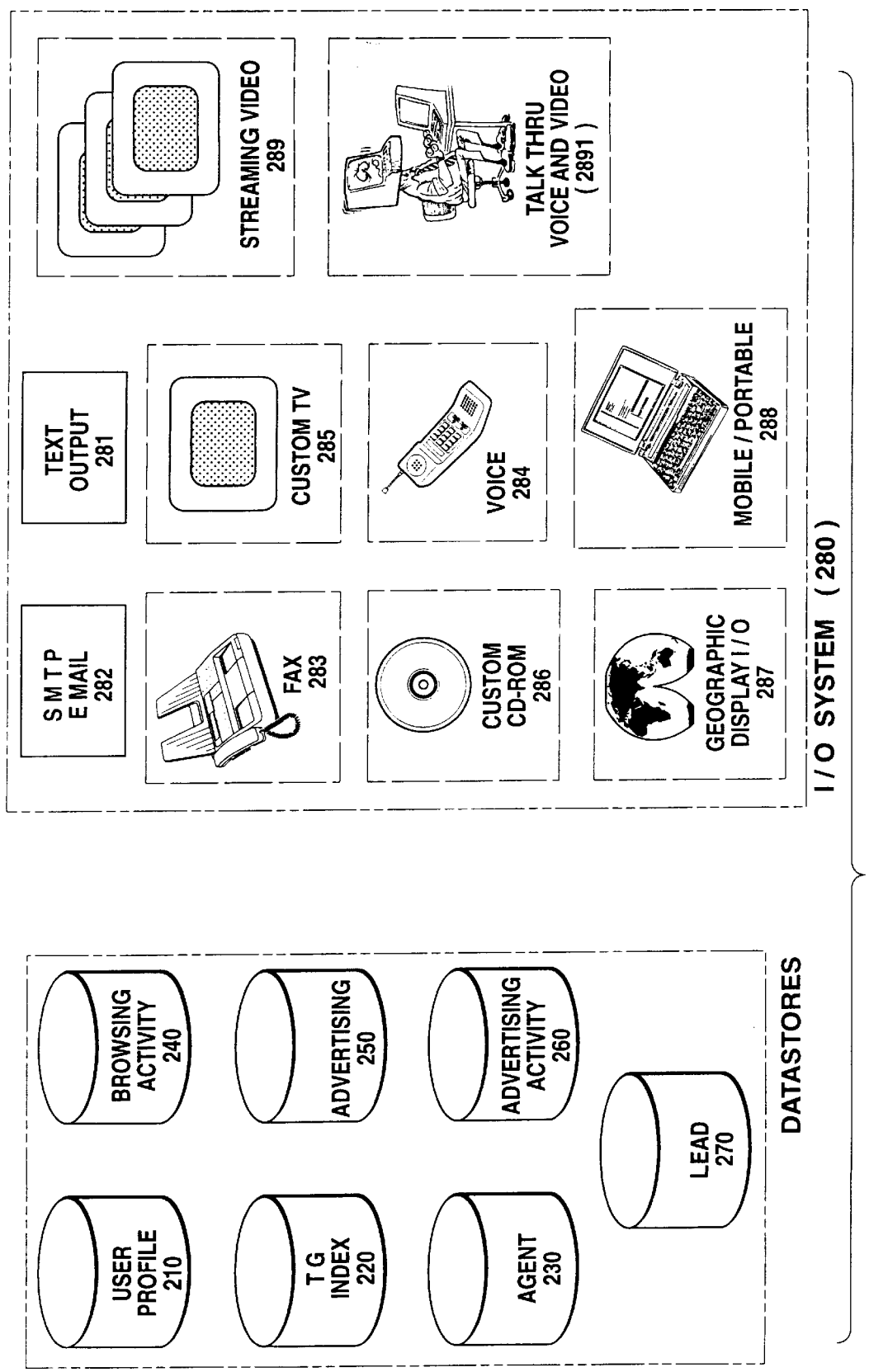
FIG. 2 illustrates several datastore categories and an I/O system consistent with the present invention.

Referring to the drawings in detail, FIG. 1 illustrates a diagram showing the interface of the present system 200 with a user on a user access system 100 and various data sources. FIG. 2 illustrates several of the datastore categories. The use of the present invention has at least five phases:

Initial Setup For User

Initial Setup For Advertisers and Lead Generation

Ongoing Maintenance

User Session

Post Session Activity

A theme or definition of a class of information (e.g., central California travel and tourism or new automobiles) is identified. Data sources (Local DataStores (500 . . . N) and Network Accessible DataStores (300 . . . N)) are screened for relevance, quality of information and appropriateness (or may be included de facto based on their title or description). These are indexed using a text indexing software tool 2981 and the indices stored on the system index DataStore 220. An initial set of Preestablished Software Text Agents are defined. These agents are words or combinations of words that form a word based search pattern. This initial set of agents is relevant to the searches that might be performed against the class of information that was indexed. (i.e., Agents about automobiles would be developed to search a class of indexed information about new cars). These are stored in the Preestablished Software Text Agent DataStore 231. The System 200 uses any multipurpose computer central processing units with the ability to handle multiple inputs and outputs with the necessary hard disk storage and to run World Wide Web (WWW) or other network server software.

Initial Setup For Advertisers and Lead Generation

Advertisers

Advertisers, using a user access system 100 enter criteria that should met for an advertisement/coupon placement. These criteria are in the form of the complex software text search agents described above. This includes a match "threshold". When this threshold is met or exceeded, an ad/coupon will be appended to a system session. Statistical analysis known as clustering is used to evaluate the data.

The ad/coupon may be resident on the user access system 100, an advertiser's computer system (400 . . . N) or stored in the Advertising DataStore 250. Additionally, the Advertiser may include conditional criteria for ad/coupon placement (available inventory, in stock levels, excess capacity, etc.). This criteria is referenced when the "threshold" is met and if satisfactory, the ad/coupon is appended. This criteria may be tested against data input through the user access system 100, data on the advertising datastore 250 or data on the advertiser's computer system (400 . . . N). Additionally, advertisers can input World Wide Web (WWW) referential information (hot links) to be displayed with ads/coupons or on geographic map displays. These are stored on the advertising datastore 250.

Lead Generation

Lead Purchasers, using a user access system 100 enter criteria that should be met for the generation of a lead. These criteria are in the form of the complex software text search agents described above. This includes a match "threshold". When this threshold is met or exceeded, information about the current user and the information being viewed is stored in the lead datastore 270 for variable output transmission to the lead purchaser.

Ongoing Maintenance

Index Updating

Local datastores (500 . . . N) and network accessible datastores (300 . . . N) will change randomly and will become out of synchronization with the system index datastore 220. The data monitoring system 2982 will periodically monitor local datastores (500 . . . N) and network accessible datastores (300 . . . N) and when there is a change, update the index datastore 220.

Data Addition

Operators will add data to the local datastores (500 . . . N) and users using a user access system 100 will nominate data from the network accessible datastores (300 . . . N) to be added to the index datastore 220. Operators will update the indices using the data indexing service 2981 if the data passes the screening outlined in the initial setup for users above.

User Session

Login and Profiles
Browsing
Data Retrieval
User Interrupt
Ad/Coupon Insertion
Persistent Agents Login and Profiles Users using a user access system 100 access the information aggregation and synthesization system 200 through the Internet or other public or private network. The user either logs in by name or by pseudonym or from data previously stored in the user access system 100. New users create an account on the user profile datastore 210. Previous users are identified to an existing account. The user is presented with a variety of options to create or update profile information in the user profile datastore 210. This involves a single data entry option or many mini-options based on the browsing activity.

Browsing

The user is also presented with browsing options based on: activity from a previous session in the browsing activity datastore 240; predeveloped software text agents and personalized software text agents (developed in the Post Session Activity) stored in the Personal Search Text Agent DataStore 232; or combinations of all as well as situational opportunities developed by the user greeting subsystem 291. The user selects the search options to be used (or simply enters search criteria directly). This search criteria is used to search the index datastore 220 and a list of data sources is presented to the user for selection. The user indicates the information to be viewed. The user will also be presented with options to refine his search through the altering of search agent criteria (Search Reduction System 293).

Data Retrieval

The requested data is retrieved either from local datastores (500 . . . N) or network accessible datastore (300 . . . N) and presented to the user via the session management system 292. The user may jump to data referenced in the presented data. Subject to the appropriate policies of the site operation, the session management system 292 will further retrieve and present this data to the user. The user may request that data be overlaid on a geographic display using the Geographic Display I/O System 287 so that referenced information may have geographic relevance.

User Interrupt

The user interrupt system 294 will periodically notify the user of specialized software text agents that they may want to pursue. These Agents are stored in the agent datastore 230 and are derived by the real time session analysis system 295 which monitors the browsing activity datastore 240 during the user's session.

Ad/Coupon Insertion

During the session, ads/coupons are inserted alongside displayed data (text, picture or index displays) from the ad datastore 250, based on ad/coupon insertion agents 233 and inserted by the session management system 292. A Record of Insertion along with appropriate user information (may be general or precise to the name of the user) is stored in the advertising activity datastore 260.

Persistent Agents

At any time, the user may establish a persistent software Text Agent (using the persistent agent entry system 297, stored in the unmet needs agent datastore 234) with criteria, if met sometime in the future, will cause the user to be notified through the I/O System 280. These can be explicit or implicit query parameters.

Post Session Activity

Periodically, either due to a preset time interrupt, or user or advertiser event driven activity, the following can occur:

Unmet Needs Analysis
Advertising Report
Profile Updating
Lead Report
Targeted Output
Output Activity Unmet Needs Analysis Users using the user access system 100 will be able to establish persistent (stays in the system after the user quits using the system) software text agents which describe some criteria, which, if met, will cause them to be notified. These are stored in the unmet needs agent datastore 234. These unmet needs agents 234 are analyzed using the unmet needs analysis system 299 and reports are created-through the I/O System 280 for suppliers who could potentially meet those needs.

Advertising Report

Information about each Ad/Coupon appended to an information aggregation and synthesization system along with known information about the user is stored in the advertising activity datastore 260. This is reported out periodically to the advertisers/couponers using the I/O System 280.

Profile Updating

During a session or after a user discontinues use, the data viewed (recorded in the browsing activity datastore 240) is analyzed by the session profile update 2921 and the user profile datastore 210 is updated with keywords or personal search text agent datastore 232.

Lead Report

Periodically, the Software Text Lead Agents stored in the lead generation agent datastore 235 are used to analyze the data viewed (recorded in the browsing activity datastore 240) and reports prepared for lead purchasers using the I/O System 280.

Targeted Output

Users through the user input system 100 will be able to designate information to be output and the format that the I/O System 280 will use.

Output Activity (Using the I/O System 280)

All output systems will provide for the addition of specials, ads and/or coupons.

Options are

Personalized Page 281—This will create a page accessible through the WWW where the user can access requested information.

SMTP Electronic Mail 282—This allows the delivery of user requested information using the SMTP capability of the Internet and other popular electronic mail systems.

CCITT Class 3 or Class 4 Facsimile 283—This allows user requested data to be formed as a printed page and sent via Fax to a Fax receiver of the user's choice.

Voice output direct or to a Voice Mail Box 284—This translates the user requested data to audio, connects to the user or their voice mail system and transmits the audio.

Personal TV or video feed 285—This formats the data in a form compatible with transmitted video and allows viewing on demand.

Custom CD-ROM 286—This places the requested data, indices, viewers and all necessary software on a user Unique CD-ROM for physical delivery.

Geographic Display I/O System 287—This allows the user to view content geographically, to look at the geographic proximity of merchants and services and provides a vehicle for ads and hot links.

Mobile/Portable System 288—This allows Specially formatted Genie Information to be displayed or translated for a wide variety of mobile and portable devices.

Identification of Key System Components by Reference Numerals

100 User Access System
200 System comprised of:
   210 User Profile DataStore
   220 Travel Genie Index DataStore
   230 Agent DataStore
   231 Preestablished Software Text Agents
   232 Personal Search Text Agents
   233 Ad/Coupon Insertion Agents
   234 Unmet Need Agents
   235 Lead Generation Agents
   240 Browsing Activity DataStore
   250 Advertising DataStore
   260 Advertising Activity DataStore
   270 Lead DataStore
   280 I/O System
   281 Personalized Page Output System
   282 SMTP Electronic Mail System
   283 CCITT Class 3 or Class 4 Facsimile
   284 Voice Output
   285 Personal TV or Video Feed
   286 Custom CD-ROM
   287 Geographic Display I/O System
   288 Mobile/Portable Device System
   290 Operations System
   291 User Greeting System
   292 Travel Genie Session Management System
   2921 Session Profile Update
   293 Search Reduction System
   294 User Interrupt System
   295 Real Time Session Analysis System
   296 Ad/Coupon Insertion System
   297 Persistent Agent Entry System
   298 Data Support Systems
   2981 Data Indexing Service
   2982 Data Monitoring System
   299 Unmet Needs Analysis System
300 Network Accessible DataStores
   301 . . . N
400 Advertiser's Computer Systems
   401 . . . N
500 Local DataStores
   501 . . . N 100 User Access System This is a network addressable interface device, such as a conventional personal computer capable of initiating and maintaining a network connection and sending, receiving and displaying data including a digitized data visual representation device such as a monitor and auxiliary storage, such as a floppy disk drive. It may also be a TV set, smart telephone or network appliance with similar capabilities. It will maintain a connection through a modem (a modulator/demodulator device) that enables data to be transmitted and received.

200 FIG. 2 illustrates datastores utilized as a part of the invention. The information aggregation and synthesization system includes:

210 User Profile DataStore

This contains data about the user, preferences, situational preferences, accounting information, psychographic profile, personal profile and other relevant information related to the user by individual identifier.

220 System Index DataStore
This is the index of data accessible by the system. It is established initially and updated as data changes or new data sources are added. It is queried by Agents from the Agent DataStore 230 or by key words.

230 Agent DataStore

231 Preestablished Software Text Agents
These are complex software text search patterns predefined by the site subject matter experts using their extensive knowledge of information contained within the site's indices.

232 Personal Search Text Agents
These are complex software text search patterns that may be individual words or word sets and/or combinations of words and Preestablished Software Text Agents 231 including the results of the post session analysis 2921 that provide individually customized searching of the Index DataStore 220.

233 Ad/Coupon Insertion Agents
These are complex software text search patterns that when matched within the text being reviewed within a given session, cause an advertisement/coupon to be added into the display. These can be direct insertion or conditioned from criteria on the Advertiser's Computer Systems (400 . . . N) and/or the user's profile from the user profile datastore 210.

234 Unmet Need Agents
These are complex software text search patterns created by the user to persist after the end of the user session looking for patterns and/or specific events or data that are observed within the System 200 at some future time.

235 Lead Generation Agents
These are complex software text search patterns that when matched within the text being reviewed within a given session, causes an addition to the Lead DataStore 270 for output to the lead purchaser using the I/O System 280.

240 Browsing Activity DataStore
This is the record of the "looking" activity of each user in each session.

250 Advertising DataStore
This is the storehouse of ads to be presented when a match is made by the Ad/Coupon Insertion Agent 233.

260 Advertising Activity DataStore
This is the record or ads presented by the Ad/Coupon Insertion System 296 and information about the user seeing the ads from the Browsing Activity DataStore 240 and the user profile datastore 210.

270 Lead DataStore
When a Lead Generation Agent 235 makes a match, Data about the user from the user profile datastore 210 and the Browsing Activity DataStore 240 is stored here.

280 I/O System
These are the various ways that output can be channeled, for the user, the advertiser or the lead purchaser.

281 Personalized Page Output System
This allows output text and associated objects to be formatted for general or selective viewing through any system using Hypertext Markup Language (HTML), VRML (Virtual Reality Modeling Language) or other network compatible display based language either locally or over a network.

282 SMTP Electronic Mail System
This allows output text for whatever purpose to be formatted in a format compatible with the SMTP (Simple Mail Transport Protocol) and transmitted to a designated addressee.

283 CCITT Class 3 or Class 4 Facsimile
This allows output text and associated objects for whatever purpose to be formatted to be compatible with the CCITT Class 3 or Class 4 Fax standard and transmitted to a designated fax receiver.

284 Voice Output
This allows output text for whatever purpose to be formatted into voice for transmission to a human receiver or a voice mail box.

285 Personal TV or Video Feed
This allows output text and associated objects for whatever purpose to be formatted as a TV signal (any international standard) to be accessed and replayed using local or network capability at the request of an individual user (or a class of users).

286 Custom CD-ROM
This allows the user to designate certain data to be placed onto a CD-ROM along with all necessary search and viewing software as well as non user requested ads and promotions.

287 Geographic Display I/O System
This allows data requested by the user to be overlaid on a geographic reference system (a map).

288 Mobile Device System
This allows output to be formatted for a variety of devices including but not limited to: pagers, personal digital assistants, mobile computing devices and other wireless devices.

290 Operations System

291 User Greeting System
This is the subsystem that identifies users, customizes search screens, incrementally collects explicit profile information and formulates search agent screens and search specials which may be situational or seasonal or both.

292 Session Management System
This tracks and records a user's browsing activity, sets ID tokens, establishes accounts, translates anonymous users to named users and manages the user's implicit profile information.

2921 Session Profile Update
Uses the Browsing Activity DataStore 240 records, to analyze and update the user's profile in the user profile datastore 210.

293 Search Reduction System
This aids the search by suggesting changes to the complex software text search agents to refine the user's search.

294 User Interrupt System
Based on the Real Time Session Analysis 295 of the users looking activity (stored in 240), determines associated references, agents or other information to be offered to the user and interrupts the user's session with an interactive data screen.

295 Time Session Analysis System
This monitors the user's browsing activity and analyzes the apparent interests to trigger the user interrupt system 294.

296 Ad/Coupon Insertion System
This looks at the current display requested by the user with a Ad/Coupon Insertion Agent 233, determines which ads should be placed (or rotated) and makes the placement (or establishes the rotation).

297 Persistent Agent Entry System
   This is the mechanism whereby the user enters the Unmet Need Agent 234. This agent monitors text and data changes and if the requested data/pattern occurs, the user is notified via the I/O System 280.

298 Data Support Systems
   2981 Data Indexing Service
      This is the facility that indexes designated DataStores (either Network Accessible DataStore (300 . . . N) or Local DataStores (500 . . . N) upon operator input or periodically and stores these indices in the Index DataStore 220.
   2982 Data Monitoring System
      This facility, periodically or on demand, checks indices stored in the Index DataStore 220 against actual data (either Network Accessible DataStore (300 . . . N) or Local DataStores (500 . . . N)) and if it has changed, queues for operator review or updates indices.

299 Unmet Needs Analysis System
   This analyzes the persistent agents for common patterns or specific requests that can be custom tailored. The results are outputted through the I/O System 280.

300 Network Accessible DataStores
   301 . . . N
   These are an infinite number of network data sources that are included in the scope of the information aggregation and synthesization. These are represented by (300 . . . N).

400 Advertiser's Computer Systems
   401 . . . N
   These are DataStores established by advertisers to store ads/coupons to be presented or to set additional conditions for display.

500 Local DataStores
   501 . . . N
   These are similar to the 300 series but locally vs. wide area network accessible.

Each of the six aspects of the present invention will be discussed in detail.

I. URL Munging

The present invention becomes a gateway to network data content provided by-others. The present invention directs access which is controlled through an intermediary gateway system.

The user, through a network addressable interface device such as the user access system 100, will connect with a local or network accessible datastore. The user will select a page (designated by a Uniform Resource Locator or URL) to be used. The URL will be modified or "munged" so that retrieval must go through the present invention when the user executes a retrieval request. This then permits return of requested data to the user from the datastore, at all times passing through the present invention 200.

The URLs embedded in each page that pass through are indexed by the present invention or "munged" so that any hyper linking to another WWW site always goes through the present invention. As an example, "WWW.anywhere.com" is converted to "WWW.travelgenie.com? WWW.anywhere.com", even though the user will see a direct path to the distant site.

Accordingly, when the user clicks on a URL (or types it in a browser's search request), the user will connect to the requested site through the system 200.

II. WWW—CD ROMS

The user of a network addressable interface device will select World Wide Web (WWW) data content for retrieval using a search engine to return selected WWW references. The user will then select and-designate certain of these references to be included in a custom CD-ROM which will be burned or recorded onto a compact disc and then sent by express delivery to the user.

Figure 5:
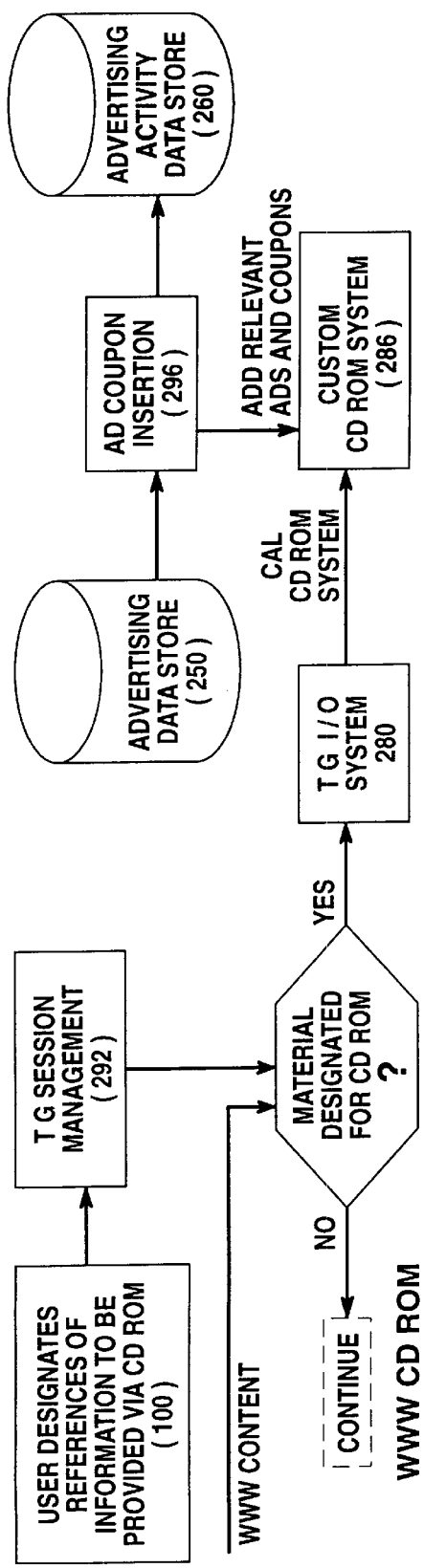
FIG. 5 illustrates a flow diagram for a WWW CD ROM consistent with the present invention.

The user will designate pages and other WWW data content including but not limited to HTML files, audio files, still images and other graphic files from the WWW. Through the session management system 292, selected material will be designated and retrieved. The retrieved data will be included in a custom CD-ROM produced by a service bureau and then sent by a delivery service to the user. FIG. 5 shows a process flow diagram.

Optionally, the designated data may be communicated to the user via automated telephone means, may be communicated to a user via electronic replication, or may be copied on to auxiliary computer storage such as through a floppy disk drive.

III. Software Agent Advertising Information

Advertising is provided which benefits the user while optimizing the advertiser's expenditure by only presenting ads or coupons (or ads and coupons in a rotation if multiple ads/coupons qualify) that are pertinent to that particular user.

Certain criteria will be entered which delineates a pattern that is requested to be monitored. When this pattern is seen (or is in close match) in the user's WWW activity, the insertion mechanism is activated. If a certain web page is requested, the present invention will display a particular advertisement. The ad will be inserted based on the content of the existing web page being read. An analysis of the text stream of the user's interactive session will be performed on-line. When certain text patterns are observed (or close matches are observed), an advertisement is inserted into the display.

The advertising may be static or connected to the advertiser's computer datastore which designates specific ads or coupons based on the pattern match and other conditions which may be required.

Figure 6:
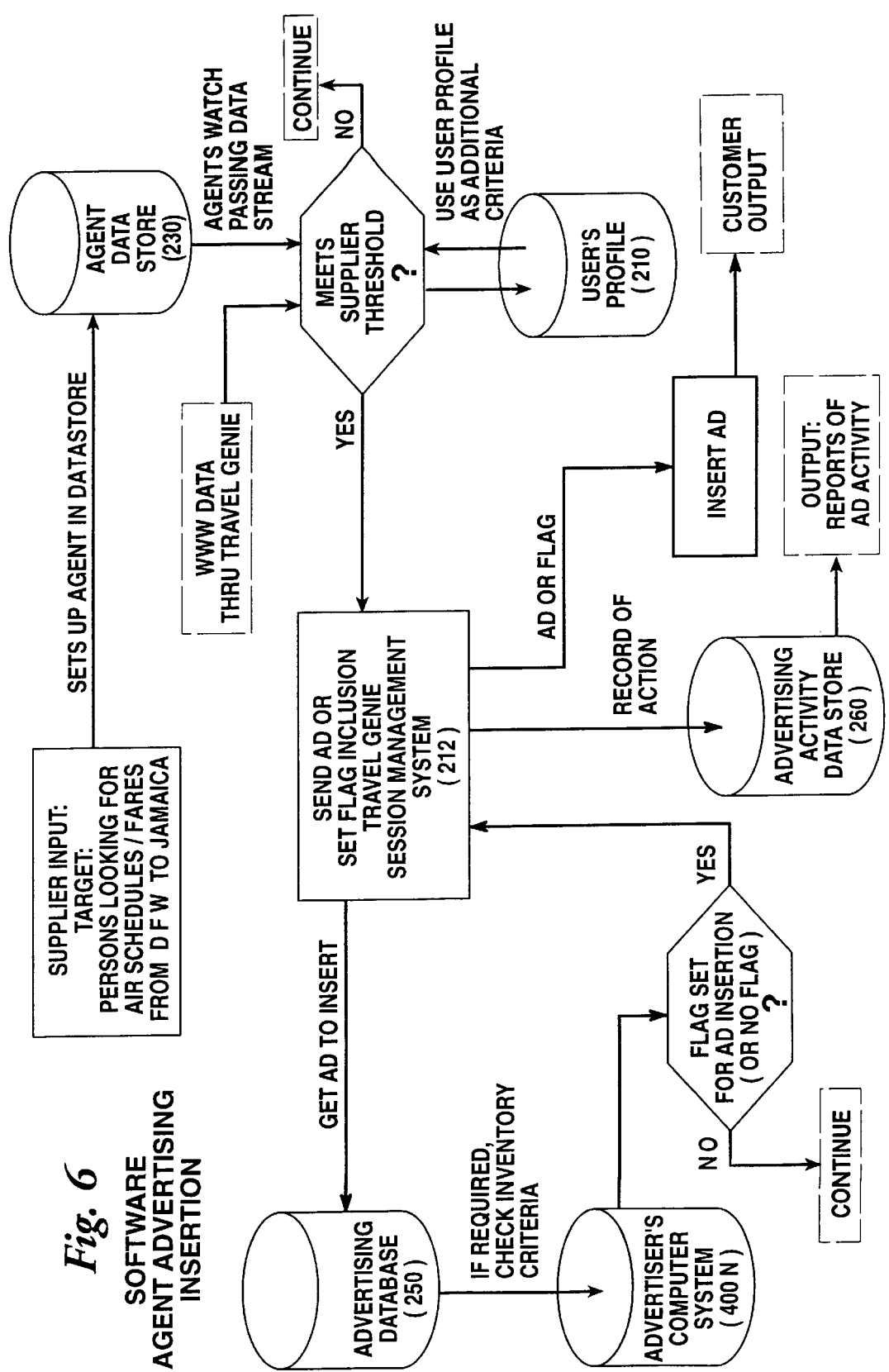
FIG. 6 illustrates a flow diagram for a software agent advertising insertion consistent with the present invention.

FIG. 6 illustrates a flow diagram for the software agent advertising insertion.

The software agent criteria is entered by the merchant in the agent data store 230 which delineates a pattern that needs to be monitored.

As an example, if the user accesses web pages for "Holiday Inns on the West Coast", the insertion mechanism would be established to automatically insert ads for "Hilton Inns on the West Coast".

IV. Automated Profile Generation

Browsing patterns of the user are analyzed and these patterns update profiles automatically.

Figure 7:
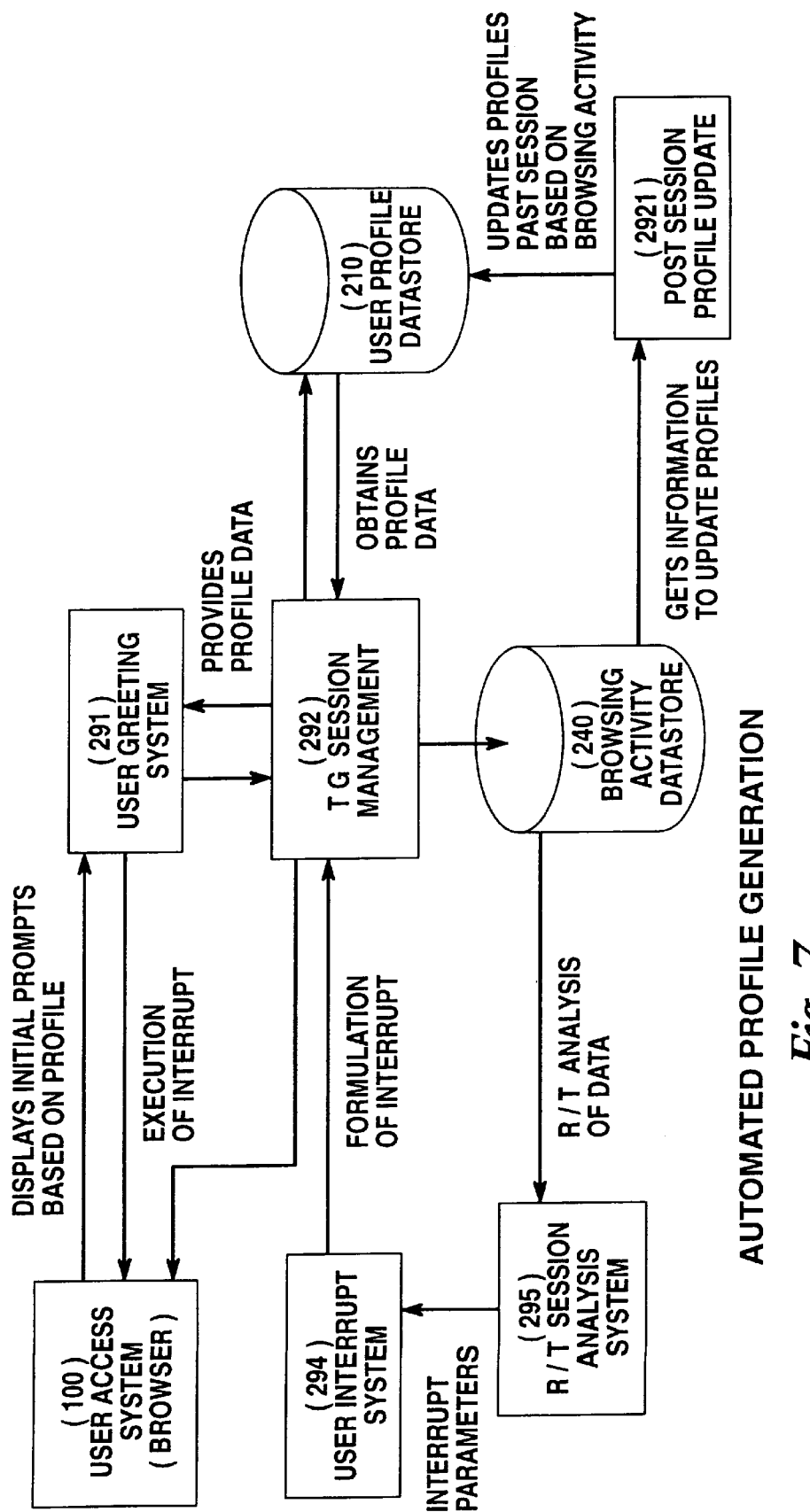
FIG. 7 illustrates a flow diagram for automated profile generation consistent with the present invention.

FIG. 7 illustrates a flow diagram for the Automated Profile Generation

The looking patterns of the user are monitored to develop a set of software text agent profiles that are integrated with explicitly collected profile information to assist the user in narrowing down information for future sessions as well as suggesting references, merchandise or services during the current session. This is accomplished by statistical analysis of the text stream.

The searching patterns of the user on the Internet are monitored by monitoring the text stream. A set of software text agent profiles is developed and may be integrated with explicitly collected profile information. The explicit information is gathered by queries to the user. The explicit and implicit data are merged to develop software text agents that support the user's future shopping sessions.

V. Automated Lead Generation

It is known that suppliers will pay for information gathered about user's specific interests. When tied to a specific user, these become "leads" that a supplier can use for off-line follow up. The automated lead generation aspect will analyze a user's profile and session looking activity against a profile established by a supplier. When this profile is approximately matched, the supplier is notified so it can contact the user to offer goods or services. Statistical analysis using complex software text agents is used to determine the match.

FIG. 8 illustrates a flow diagram of the lead generation.

In the present invention, the user's WWW viewing patterns are monitored. These and optionally the user's profile 210 are matched against software text agents entered by a supplier in an agent datastore 230. When these agents match a pattern or profile, the supplier is notified. Additionally, when this profile is approximately matched, the supplier is notified. Lead purchasers, using a user access system 100, will enter criteria that should be met for the generation of a lead. These criteria are in the form of complex software text search agents. When this threshold is met or exceeded, information is stored in the lead datastore 270 for variable output transmission to a lead purchaser.

VI. Software Agent Unmet Needs Generation

In the present invention, records will be maintained from user usage of the Internet and other networks on what consumer queries are unmet by the WWW content retrieved.

Figure 9:
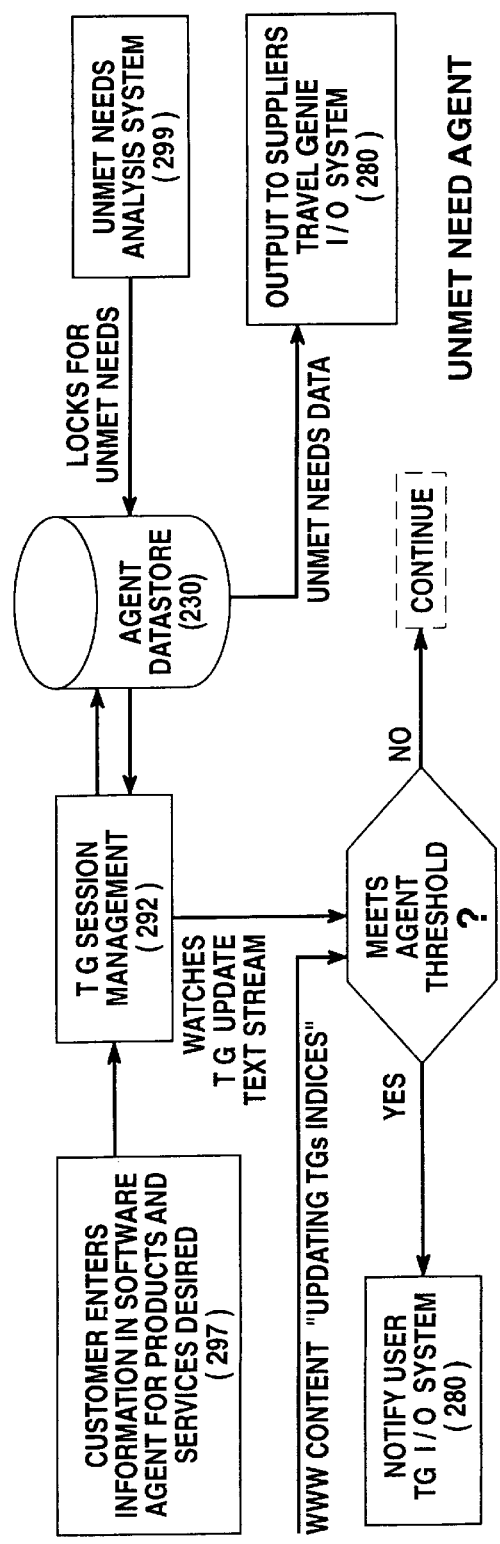
FIG. 9 illustrates a flow diagram for an unmet need agent consistent with the present invention.

FIG. 9 illustrates a flow diagram.

If the user does not find what they are looking for, a "watcher" agent may be set up to advise them if the object of their search occurs at some future time. An example would be a tour, a price or some other information. Through the session management system 292 a threshold will be established on the user need.

The invention will intuitively construct a profile from user inputted data. This will be done by recognizing unmet or unanswered queries and/or user initiated requests. From this, a profile will be developed to identify new markets. The system will thus be able to gather "negative" leads. This information may be extracted and sold to suppliers who will build new products and services and then use the system as a mechanism to notify the potential customer.

Whereas, the present invention has been described in relation to the drawings attached hereto, it should be understood that other and further modifications, apart from those shown or suggested herein, may be made within the spirit and scope of this invention.

What is claimed:

1. A method for notifying a third party of a demand for information by users of a network, the method comprising the steps of:

receiving a user request to locate particular information on a network accessible datastore;

determining whether the particular information is present on the datastore;

collecting data reflecting a number of requests for the particular information when the particular information is determined to be absent from the datastore; and forwarding the collected data to the third party to notify the third party of a demand for the particular information.

2. The method of claim 1, wherein the collecting step further includes the substep of:

collecting data reflecting search patterns of the users.

3. The method of claim 1, wherein the forwarding step further includes the substep of:

forwarding the collected data to the third party based upon a threshold matching of a predetermined criteria and the collected data.

4. A computer for notifying a third party of a demand for information by users of a network, the computer comprising:

a memory having program instructions; and a processor, responsive to the program instructions, configured to:

receive a user request to locate particular information on a network accessible datastore;

determine whether the particular information is present on the datastore;

collect data reflecting a number of requests for the particular information when the particular information is determined to be absent from the datastore; and forward the collected data to the third party to notify the third party of a demand for the particular information.

5. The computer of claim 4, wherein the processor is further configured to collect data reflecting search patterns of the users.

6. The computer of claim 4, wherein the processor is further configured to forward the collected data to the third party based upon a threshold matching of a predetermined criteria and the collected data.

7. A computer-readable medium containing instructions for controlling a data processing system to perform a method for notifying a third party of a demand for information by users of a network, the method comprising the steps of:

receiving a user request to locate particular information on a network accessible datastore;

determining whether the particular information is present on the datastore;

collecting data reflecting a number of requests for the particular information when the particular information is determined to be absent from the datastore; and forwarding the collected data to the third party to notify the third party of a demand for the particular information.

8. The method of claim 7, wherein the collecting step further includes the substep of:

collecting data reflecting search patterns of the users.

9. The method of claim 7, wherein the forwarding step further includes the substep of:

forwarding the collected data to the third party based upon a threshold matching of a predetermined criteria and the collected data.

10. An apparatus for notifying a third party of a demand for information by users of a network, the apparatus comprising:

means for receiving a user request to locate particular information on a network accessible datastore;

means for determining whether the particular information is present on the datastore;

means for collecting data reflecting a number of requests for the particular information when the particular information is determined to be absent from the datastore; and means for forwarding the collected data to the third party to notify the third party of a demand for the particular information.

11. The apparatus of claim 10, wherein the means for collecting further includes:

means for collecting data reflecting search patterns of the users.

12. The method of claim 10, wherein the means for forwarding further includes:

means for forwarding the collected data to the third party based upon a threshold matching of a predetermined criteria and the collected data.

\* \* \* \* \*